United States Patent [19]

Sommers

[11] Patent Number: 5,188,810
[45] Date of Patent: Feb. 23, 1993

[54] PROCESS FOR MAKING NIOBIUM OXIDE

[75] Inventor: James A. Sommers, Albany, Oreg.

[73] Assignee: Teledyne Industries, Inc., Albany, Oreg.

[21] Appl. No.: 863,485

[22] Filed: Apr. 2, 1992

Related U.S. Application Data

[63] Continuation of Ser. No. 721,888, Jun. 27, 1991, abandoned.

[51] Int. Cl.⁵ ............ C01G 33/00; C01G 31/00; C01G 35/00; C01B 33/113
[52] U.S. Cl. .................... 423/62; 423/138; 423/325; 423/439; 423/440; 423/592; 423/644
[58] Field of Search ............ 423/62, 439, 440, 644, 423/592, 325, 345, 138; 501/87, 88

[56] References Cited

U.S. PATENT DOCUMENTS

| | | | |
|---|---|---|---|
| 2,164,198 | 6/1939 | Clements et al. | 148/4 |
| 2,474,021 | 6/1949 | Vining | 23/184 |
| 2,553,444 | 5/1951 | Dunn et al. | 241/20 |
| 2,682,445 | 6/1954 | Basel | 23/87 |
| 2,849,275 | 8/1958 | Bleecker | 23/14 |
| 2,886,616 | 5/1959 | Mertz et al. | 260/683.15 |
| 3,053,620 | 9/1962 | Greenberg et al. | 23/87 |
| 3,230,077 | 1/1966 | Hiller | 75/84.5 |
| 3,300,297 | 1/1967 | Fields | 75/24 |
| 3,322,510 | 5/1967 | Anselin et al. | 23/347 |
| 3,356,513 | 12/1967 | Washburn | 106/55 |
| 3,425,826 | 2/1969 | Schmidt et al. | 75/84 |
| 3,461,190 | 8/1969 | Kemeny | 263/52 |
| 3,539,165 | 11/1970 | Ingels | 263/40 |
| 3,573,000 | 3/1971 | Toomey et al. | 23/277 |
| 3,639,101 | 2/1972 | Washburn | 106/55 |
| 3,854,882 | 12/1974 | Washburn | 23/253 A |
| 3,999,981 | 12/1976 | Brandstatter | 75/84 |
| 4,029,740 | 6/1977 | Ervin, Jr. | 423/251 |
| 4,211,754 | 7/1980 | Van Hecke et al. | 423/62 |
| 4,318,897 | 3/1982 | Gonczy | 423/644 |
| 4,425,318 | 1/1984 | Maeland et al. | 423/644 |
| 4,440,737 | 4/1984 | Libowitz et al. | 423/644 |
| 4,607,826 | 8/1986 | Ron | 266/251 |
| 4,720,300 | 1/1988 | Nishizawa et al. | 75/84.5 |
| 4,727,928 | 3/1988 | De Vynck et al. | 165/469 |
| 4,728,507 | 3/1988 | Worcester | 423/645 |
| 4,741,894 | 5/1988 | Melas | 423/592 |
| 4,812,301 | 3/1989 | Davidson et al. | 423/440 |
| 4,913,778 | 4/1990 | Lee et al. | 203/29 |

FOREIGN PATENT DOCUMENTS

| | | |
|---|---|---|
| 470022 | 12/1945 | Canada . |
| 541516 | 5/1957 | Canada . |
| 541517 | 5/1957 | Canada . |
| 554840 | 3/1958 | Canada . |
| 903034 | 12/1953 | Fed. Rep. of Germany . |
| 1068683 | 11/1959 | Fed. Rep. of Germany . |
| 1082240 | 5/1960 | Fed. Rep. of Germany . |
| 3-39426 | 2/1991 | Japan . |
| 485021 | 6/1938 | United Kingdom . |
| 660397 | 11/1951 | United Kingdom . |
| 771144 | 3/1957 | United Kingdom . |
| 866771 | 5/1961 | United Kingdom . |
| 910289 | 11/1962 | United Kingdom . |
| 1311757 | 3/1973 | United Kingdom . |

OTHER PUBLICATIONS

Mellor, "A Comprehensive Treatise on Inorganic Chemistry", vol. VIII, Longmans, Green & Co., 1947, pp. 124-126.

(List continued on next page.)

Primary Examiner—Michael Lewis
Assistant Examiner—Stephen G. Kalinchak
Attorney, Agent, or Firm—Shoemaker and Mattare, Ltd.

[57] ABSTRACT

A process for preparing metal oxides from ferrometal and nickel metal alloys is disclosed comprising first providing a ferrometal or nickel metal alloy containing an oxide forming metal, hydriding the alloy to an effective temperature and pressure with hydrogen containing gas, subdividing then carbiding the hydrided product at a temperature above about 500° C. to form carbides, then employing an aqueous acid leach to dissolve the iron or nickel carbide and separating the acid soluble from the acid insoluble carbides. The acid insoluble carbides are reacted with oxygen at an elevated temperature for a time sufficient to form the metal oxides of said carbides.

12 Claims, 1 Drawing Sheet

OTHER PUBLICATIONS

Duke, Resources and Planning Advisory Council, vol. VIII, pp. 1–51, 1969.

Stuart, Niobium, Proceedings of the International Symposium, pp. 3–16; 1237–1249, 1981.

Gibalo, Analytical Chemistry of Niobium and Tantalum, pp. 118–140, 1970.

Merrill, The Separation of Columbium and Tantalum by Means of Selenium Oxychloride, pp. 2378–2383, 1921.

Hattangadi, "How to Set a Periodic Table", *Industrial Chemist*, vol. 9, No. 5, 1988, pp. 20–23.

Hart, The Reduction of Columbic Acid and the Measurement of the Oxidation Potential of the Pentavalent-Trivalent Columbium System, 226–7, 1926.

Sherwood, Columbium, Rare Metals Handbook, pp. 149–177.

McClain et al., Zirconium-Hafnium Separation, Chapter 4, pp. 64–73, 1960.

Kroll et al., Pilot Plants, Production of Malleable Zirconium, vol. 42, No. 2, pp. 395–396, 1950.

Fairgrieve et al., Hafnium, Molybdenum Techniques Revealed, Journal of Metals, pp. 25–26, 1960.

Spink, Fused-Salt Scrubbing of Zirconium Tetrachloride, Transactions Aime, vol. 224, pp. 965–970, 1962.

Fairbrother, The Chemistry of Niobium and Tantalum, pp. 4, 5, 8–19, 1967.

de Hoboken, Production of Tantalum and/or Columbium, pp. 1–6.

Pennington, Derivatives of Columbium and Tantalum, 1985.

PROCESS FOR MAKING NIOBIUM OXIDE

This is a continuation of application Ser. No. 07/721,888, filed Jun. 27, 1991 now abandoned.

FIELD OF THE INVENTION

This invention relates to the preparation of metal oxides and more particularly to a novel process for the production of substantially pure metal oxides from the ferroalloys of Group IV, V and VI metals and most particularly, with niobium, tantalum, vanadium and silicon metal.

BACKGROUND OF THE INVENTION

Niobium oxide is exemplary of the metal oxides which can be produced according to the present invention and is an important intermediate for the production of pure niobium metal and high purity, i.e., vacuum grade, ferroniobium. It is, therefore, desirable to obtain substantially pure niobium oxide for the subsequent reduction reaction to niobium metal or by metallothermic reaction with iron to form vacuum grade ferroniobium.

A ready source of niobium is available in the form of commercial grade ferroniobium alloys containing 20% to 40% by weight iron (Fe); and including minor amounts of tantalum, phosphorous, titanium and silicon. The presently available processes for the recovery of niobium oxide ($Nn_2O_5$) from this source of FeNb include the chlorination of FeNb followed by a high temperature separation of the vapor phases of ferric chloride ($FeCl_3$) from the niobium pentachloride ($NbCl_5$) produced by passing the vapors of those chlorides through a bed of sodium chloride (NaCl) where the $FeCl_3$ forms a eutectic composition with the NaCl, removing it from the vapor stream. Niobium chloride is then recovered by cooling the salt vapor to condense the ($NbCl_5$). The $NbCl_5$ can then optionally be distilled if desired before hydrolysis. Conventionally, NbCl is hydrolyzed by its addition to water which can be subsequently neutralized, and dried, before calcining in a heated kiln to produce relatively pure $Nb_2O_5$. The drying and calcining is both energy intensive and expensive.

The preparation of $Nb_2O_5$ by the described chlorination route utilizes toxic chlorine gas reacted exothermically at elevated temperatures and pressures. These conditions produce severe corrosion problems. Special equipment is necessary for handling the highly pressurized, corrosive liquid chlorine and it must be safely vaporized, metered and fed into the reactor. Likewise, the most suitable material for reactor construction is graphite. This is a brittle material which can fracture and fail abruptly after a short time in use in this environment. Further, the chlorine is normally used in excess to ensure complete reaction with the FeNb and the excess must be neutralized creating an expensive, undesirable by-product.

In addition to the foregoing, the hydrolysis step involves contacting the condensed chloride product with a neutralizing agent such as ammonia, and then filtering the resulting hydrous oxide slurry or cake, then firing it to oxide in a kiln. Such slurries and cakes are gelatinous and therefore hard to handle. There is need for a process which doesn't have to deal with such intractable intermediate products.

OBJECTS OF THE INVENTION

It is an object of the present invention to provide a process for the preparation of substantially pure niobium oxide ($Nn_2O_5$) from commercially available ferroniobium alloy.

It is a further object of the present invention to provide a process for the preparation of substantially pure $Nb_2O_5$ from ferroniobium alloy without the process step of chlorination.

It is a still further object of the present invention to provide a process for the preparation of substantially pure $Nb_2O_5$ from ferroniobium alloy without the process steps including hydrolysis and neutralization.

It is a still further object of the present invention to provide a method for producing oxides of the Group IV, V and VI metals from their respective carbides formed by the reaction of a hydrocarbon gas with hydrided ferro and nickel metal alloys.

SUMMARY OF THE INVENTION

Niobium oxide ($Nn_2O_5$) and other oxides of Group IV, V and VI metals are prepared according to the present invention by the following process steps starting with the ferrometal alloy or the nickel metal alloy of the desired metal oxide. The ferrometal alloy of niobium and iron is described herein as exemplary of the metals described.

Starting with commercial or metallurgical grade ferroniobium, the process includes:
1) Hydriding the ferroalloy;
2) Comminuting the hydrided ferroalloy to a preselected range of particle sizes;
3) Reaction of the hydrided ferroalloy with a hydrocarbon containing gas at elevated temperatures to form metal carbides;
4) Leaching the iron and iron containing compounds formed in Step 3) away from the metal carbides by the use of an aqueous acid leach liquor;
5) Oxidizing the residue of the leach containing the desired metal carbides to obtain the desired metal oxide.

DETAILED DESCRIPTION OF THE PREFERRED EMBODIMENTS

Figure 1:
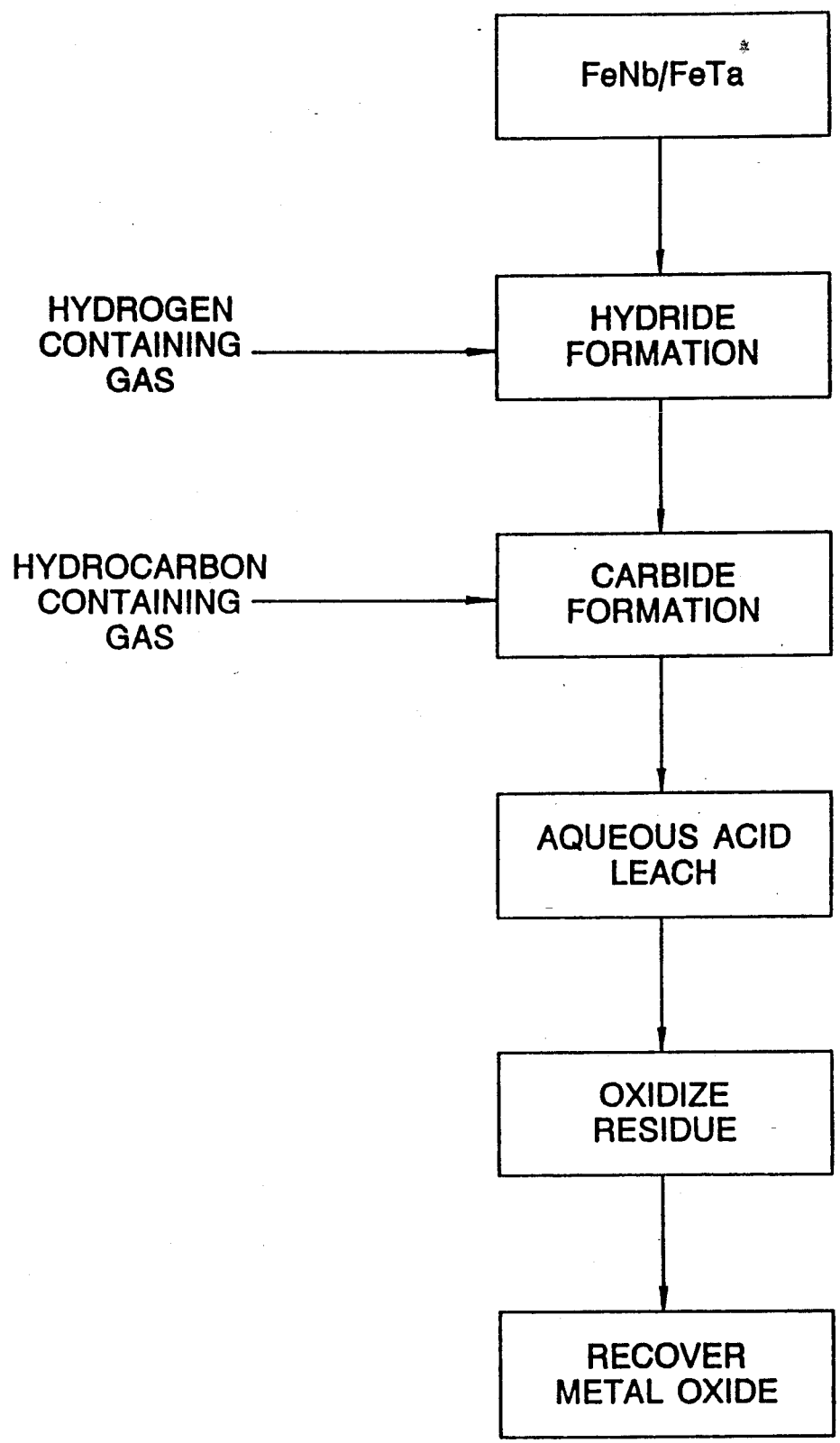
FIG. 1 is a schematic block diagram of the process of the present invention.

The foregoing process steps are described in further detail hereinafter.

Hydriding the Ferroalloy

Commercial grade ferroniobium is used as the starting material. Typically, the ferroniobium will contain from between about 20% and 40% weight percent iron and minor amounts, i.e., less than about 10% total weight percent of silicon, aluminum, tantalum, phosphorus and titanium.

The ferroniobium is contacted in a suitable reaction vessel with an atmosphere of hydrogen gas that is exclusive of significant amounts of oxygen or other reactive gases, which is maintained at a positive pressure of up to about 15 psig.

Preferably, the ferroniobium is charged into a vacuum-tight, sealable reactor. The reactor is then evacuated and backfilled with hydrogen to a positive pressure up to about 15 psig. The reactor is held at room temperature. Higher temperatures may be employed as well as higher pressures, however, that is not necessary for a successful reaction and acceptable reaction rate for the uptake of the hydrogen by the ferroniobium. When reacted for up to about 90 minutes, the hydrogen level of the product is raised to between about 200 ppm and 2000 ppm, 1200 ppm being typical. This level of hydrogen in the ferroniobium provides a hydrided product which is friable and easily comminuted into preselected particle sizes suitable for the subsequent reactions.

Comminuting the Hydrided Ferroalloy

The product of the hydriding step containing between about 200 to 2000 ppm hydrogen and typically about 1200 ppm hydrogen is removed from the reaction vessel and comminuted by grinding or milling or other equivalent size reduction operations to prepare the ferroniobium hydride product to a particle size of less than about 20 mesh and preferably less than about 140 mesh.

Reaction with a Hydrocarbon Containing Gas

The comminuted hydrided ferroalloy containing from between about 200 to about 2000 parts per million by weight of hydrogen is contacted in a suitable reaction vessel with gas containing hydrocarbons which are gaseous at the reaction temperature which can be from about 700° C. to about 1100° C. A rapid reaction rate can be achieved at temperatures of about 900° C. The following example typifies the results which can be obtained.

EXAMPLE 1

Ferroniobium hydride of less than 140 mesh, (16.70 g) was placed in a ceramic boat inside a quartz tube in a muffle furnace. Methane gas was flowed (200 ml/min) over it as its temperature was raised to 970° C. for more than two hours and held at 970°-975° C. for 3½ hours. It was then cooled to room temperature. A weight gain of 4.56 g was observed. The hydrided ferroniobium charged was not ferromagnetic. The product of the reaction described to form the carbides of iron and niobium was ferromagnetic. At the temperatures employed, significant diffusion of the iron and iron compounds away from the niobium carbide was observed.

Leaching of the Carbide Product

The previous step having made the iron content of the ferroniobium compound available for leaching, it can be substantially removed, along with silicon and phosphorous by using dilute HCl containing fluoride ions. The fluoride source may be a soluble, fluoride ion producing compound, such as hydrofluoric acid, ammonium bifluoride or sodium fluoride. The leach is aided by being conducted at somewhat elevated temperatures such as about 50° C. After leaching, the product solids are rinsed and either dried or fed to a kiln directly for conversion to oxide.

Oxidation of the Leached Product to Recover Niobium Oxide

The product of acid leach or fluoride-containing acid leach, when contacted with an oxidizing agent such as air in a kiln, will be converted to the desired oxide. This may be done most simply by feeding the damp leached solids directly to a kiln, so that they burn in air. The leached product is unexpectedly easy to oxidize at relatively low temperatures, being capable of rapid and complete conversion to the oxide at temperatures between about 300° C. to 1000° C. and preferably temperatures below 350° C.

A further advantage of the low temperature oxidation process is that impurities remaining after the leaching step can be further leached because there is less tendency at low oxidation temperatures to form stable mixed oxides such as $FeNbO_4$ and $NbPO_5$. The latter contribute to the unleachability of Fe and P, respectively.

An example of how the process of the present invention may be operated to produce either standard niobium oxide, or high purity oxide (suitable for vacuum grade ferroniobium) is described hereinafter.

The leach producing vacuum grade ferroniobium suitable oxide is required to contain fluoride ion in some form, since it has been found that this best achieves the desired ion levels of Si and P.

The overall process of this invention, when applied to other ferro or nickel metal alloys for the synthesis of the respective oxides, follows the same route as described herein. Other leaching procedures may be employed.

The invention has been described with reference to the process steps and reaction conditions felt to be the most desirable. It is possible, however, to depart from these conditions significantly with respect to some ferrometal alloys nickel metal alloys.

We claim:

1. A process for the preparation of metal oxides from ferrometal and nickel metal alloys comprising the steps of:
   a) providing a ferrometal or nickel metal alloy containing an oxide-forming metal use in the process;
   b) contacting the ferrometal or nickel metal alloy with a hydrogen-containing gas;
   c) reacting the alloy selected with the hydrogen initially at ambient temperature and at about 3 psig to about 15 psig of hydrogen gas, to form a hydride product;
   d) subdividing the hydrided product into particle sizes suitable for reaction with a hydrocarbon-containing gas;
   e) carbiding the subdivided hydride product by contacting the subdivided hydride product with a hydrocarbon-containing gas at a temperature above about 500° C., for a sufficient period of time to substantially completely react the hydrocarbon-containing gas with the hydride product to form carbides of the alloy constituents;
   f) subsequent to carbide formation in the carbiding reaction, contacting the carbides produced with an aqueous acid leach solution for a sufficient period of time to dissolve the iron or nickel carbide formed during the carbiding in the leach solution; and
   g) separating the acid soluble carbides or other soluble compounds in the leach solution from the acid insoluble carbides; and
   h) reacting the acid insoluble carbides with oxygen at a sufficiently elevated temperature and for a sufficient period of time to form the metal oxide of the acid insoluble metal carbide.

2. The process of claim 1, wherein the metal of the metal oxide is selected from the group consisting of niobium, tantalum, vanadium and silicon.

3. The process of claim 1, wherein the oxide forming metal of the ferrometal alloy is selected from the group consisting of niobium, tantalum, vanadium and silicon.

4. The process of claim 1, wherein the ferrometal alloy is ferroniobium or ferrotantalum.

5. The process of claim 4, wherein the ferroniobium alloy contains from between about 60% by weight to about 80% by weight niobium.

6. The process of claim 4, wherein the hydride product of ferroniobium and hydrogen contains from between about 200 ppm and 2000 ppm hydrogen.

7. The process of claim 6, wherein the hydride product contains about 1200 ppm hydrogen.

8. The process of claim 4, wherein the carbiding reaction is initiated at a temperature of from about 700° C. to about 1100° C.

9. The process of claim 8, wherein the carbiding reaction temperature is about 900° C. during the reaction of hydrocarbon-containing gas with the hydride product.

10. The process of claim 4, wherein the carbided products of the hydrided ferroniobium are contacted with dilute hydrochloric acid at a temperature of from about 40° C. to about 60° C.

11. The process of claim 10, wherein the leach solution containing the acid insoluble carbide is subjected to kiln firing at about 400° C. in air to form a fired solid product and the fired solid product is then subjected to leaching with a fluoride ion-containing acid solution to recover oxide product which contains less phosphorus and silicon than the fired solid product.

12. The process of claim 8, wherein the reaction of the acid insoluble carbide product with oxygen is conducted in air at a temperature of from about 300° C. to about 1000° C.

* * * * *